(12) United States Patent
Kasei et al.

(10) Patent No.: US 7,045,004 B1
(45) Date of Patent: May 16, 2006

(54) COATING COMPOSITION

(75) Inventors: Kazuhiko Kasei, Kanagawa-ken (JP); Toshihiro Hamamura, Kanagawa-ken (JP); Kazuhisa Nakai, Kanagawa-ken (JP); Mineyuki Nomura, Kanagawa-ken (JP); Hidekazu Kutsuma, Kanagawa-ken (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 834 days.

(21) Appl. No.: 09/959,445

(22) PCT Filed: Aug. 30, 2000

(86) PCT No.: PCT/JP00/05869

§ 371 (c)(1),
(2), (4) Date: Feb. 8, 2002

(87) PCT Pub. No.: WO01/62864

PCT Pub. Date: Aug. 30, 2001

(30) Foreign Application Priority Data

Feb. 25, 2000 (JP) .................................. 2000-049116
Oct. 20, 2000 (JP) .................................. 2000-199907

(51) Int. Cl.
*C09D 5/16* (2006.01)
*C09D 183/02* (2006.01)
*B05D 3/10* (2006.01)

(52) U.S. Cl. ............... 106/287.16; 106/287.12; 524/81; 524/147; 524/157; 524/183; 524/184; 524/588

(58) Field of Classification Search ........... 106/287.12, 106/287.16; 524/81, 147, 157, 183, 184, 524/588
See application file for complete search history.

(56) References Cited

U.S. PATENT DOCUMENTS

| | | | |
|---|---|---|---|
| 5,635,572 A | 6/1997 | Ohnishi et al. | 525/453 |
| 5,855,960 A * | 1/1999 | Ohnishi et al. | 427/337 |
| 5,895,713 A * | 4/1999 | Miyazaki et al. | 428/335 |
| 6,221,498 B1 * | 4/2001 | Takahama et al. | 428/447 |
| 6,599,976 B1 * | 7/2003 | Kobayashi et al. | 524/837 |

FOREIGN PATENT DOCUMENTS

| | | | |
|---|---|---|---|
| EP | 0974629 | * | 1/2000 |
| JP | 52-63832 | | 5/1977 |
| JP | 55-152751 | | 11/1980 |
| JP | 59-33351 | | 2/1984 |
| JP | 60-231769 | | 11/1985 |
| JP | 63-189472 | | 8/1988 |
| JP | 64-69634 | | 3/1989 |
| JP | 69634/89 | | 3/1989 |
| JP | 2-29449 | | 1/1990 |
| JP | 2-269157 | | 11/1990 |
| JP | 4-202481 | | 7/1992 |
| JP | 249587/92 | | 9/1992 |
| JP | 5-209148 | | 8/1993 |
| JP | 6-145453 | | 5/1994 |
| JP | 11193/95 | | 1/1995 |
| JP | 7-286126 | | 10/1995 |
| JP | 9-31401 | | 2/1997 |
| JP | 9-194778 | | 7/1997 |
| JP | 10-168382 | | 6/1998 |
| JP | 10-195381 | | 7/1998 |
| JP | 10212446 | | 8/1998 |
| JP | 219190/98 | | 8/1998 |
| WO | WO 94/06870 | | 3/1994 |
| WO | WO 99/05228 | | 2/1999 |

OTHER PUBLICATIONS

Patent Abstracts of Japan, vol. 010, No. 103, (C–340), Apr. 10, 1986.
Patent Abstracts of Japan, vol. 012, No. 457, (C–550), Dec. 7, 1988.
Supplement European Search Report, EP 00 95 6801, (Jun. 2002).

* cited by examiner

*Primary Examiner*—David Brunsman
(74) *Attorney, Agent, or Firm*—Fisher, Christen & Sabol

(57) ABSTRACT

The present invention relates to a coating composition containing 0.1 to 50 parts by weight of (A) an organosilicate and/or its condensates per 100 parts by weight of a resin solid content in the coating composition, and 0.1 to 50 parts by weight of (B) an acid surface active agent or a boric acid compound per 100 parts by weight of a solid content of the component (A).

7 Claims, 1 Drawing Sheet

COATING COMPOSITION

This application is a 371 of PCT/JP00/05869, filed 30 Aug. 2000.

BACKGROUND ART

1. Field of the Invention

The present invention relates to a coating composition capable of forming a coating film showing a low contamination from early time after coating.

2. Description of Background Art

An outdoor coating composition showing good weather resistance has conventionally be applied onto outdoor substrates such as building structures, displays, guard fences, machines, vehicles and the like for the purpose of decoration or protection. However, the conventionally used outdoor coating composition had such disadvantages that the surface of a coated product may easily be contaminated and show poor appearance by influence of exhaust gas, sand, dust, iron powder, rain, sunlight, etc. during outdoor exposure.

In connection therewith, the present applicant proposed such a coating composition that the addition of an organosilicate and/or its condensates makes it possible to form a coating film having self cleaning properties and hard to be contaminated (see International Publication No. WO94/06870 specification).

However, the above coating composition had such drawbacks that hydrolysis of the organosilicate in the coating film does not easily take place depending on the weather on coating or immediately after coating, resulting in being easily contaminated before developing self-cleaning properties. An initial contamination may disappear with time, but may cause claims from clients, and self-cleaning properties from early time after coating are demanded.

3. Disclosure of the Invention

The present inventors made intensive studies for the purpose of solving the above problems to find out that a coating composition containing specified amounts of an organosilicate and/or its condensate and an acid surface active agent or a boric acid compound can form a coating film showing a low contamination from early time after coating and good interlayer adhesion properties between the coating film and a substrate.

That is, the present invention provides a coating composition containing 0.1 to 50 parts by weight of (A) an organosilicate represented by the general formula:

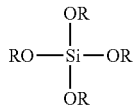

where R is same or different and represents hydrogen atom or monovalent hydrocarbon group having 1 to 7 carbon atoms, and/or its condensates per 100 parts by weight of a resin solid content in the coating composition, and 0.1 to 50 parts by weight of (B) an acid surface active agent or a boric acid compound per 100 parts by weight of a solid content of the component (A).

PREFERABLE EMBODIMENT IN THE PRACTICE OF THE INVENTION

Figure 1:
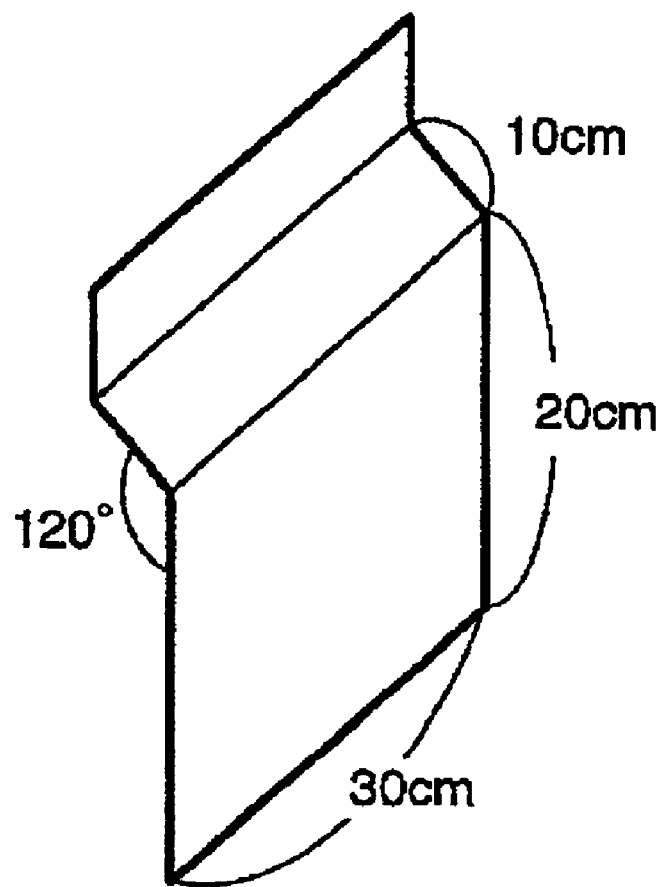
FIG. 1 is a schematic view of a test panel used in a stripe-like contaminating rain mark resistant properties test.

The organosilicate and/or its condensates (A) used in the present invention include ones represented by the above and following formulas. R in the above formula may include alkyl group, aryl group, etc. The alkyl group as R may include straight-chain ones and branched ones, for example, methyl, ethyl, n-propyl, iso-propyl, n-butyl, iso-butyl, tert-butyl, n-pentyl, is-opentyl, neopentyl, n-hexyl, iso-hexyl, and the like. Of these, lower alkyl groups having 1 to 4 carbon atoms are preferred.

The aryl group as R may include monocyclic and polycyclic ones, for example, phenyl group, toluyl group, xylyl group, and the like, phenyl group being preferred.

Preferable examples of the organosilicate used in the present invention may include tetrahydroxysilane, tetramethoxysilane, tetraethoxysilane, tetrapropoxysilane, tetrabutoxysilane, tetraphenoxysilane, dimethoxydiethoxysilane and the like. These may be used alone or in combination.

The condensate of organosilicate may include branched or straight-chain condensates between organosilicates represented by the above general formula and preferably includes condensates having a degree of condensation of 2 to 100 and represented by the general formula:

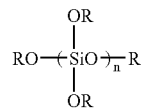

where R is defined as above, n is an integer of 2 to 100.

In the above general formula, when n is more than 100, effect of stain resistance is undesirably reduced. The condensate of the organosilicate may particularly include such ones that R in the general formula is a lower alkyl group having 1 to 4 carbon atoms and that the degree of condensation is in the range of 2 to 15.

In the case where the organosilicate and/or its condensate (A) of the present invention is particularly added to an organic solvent based coating composition, use of ones containing both ethyl group and methyl group as R in the above general formula is preferable from the standpoints of easiness of floating of the component (A) up to the surface of the coating film and hydrolysis, and an ethyl group/methyl group mixing ratio is in the range of 1/99 to 99/1, preferably 30/70 to 70/30, more preferably 40/60 to 60/40. Ethyl group in an amount less than in the above mixing ratio range makes undesirably difficult the floating of the component (A) up to the surface of the coating film, and methyl group in a less amount may undesirably retard proceeding of hydrolysis.

In the present invention, a modified organosilicate prepared by reacting the organosilicate and/or its condensate (A) with a mercapto compound or a boric acid compound may also be used from the standpoint of promoting the hydrolysis reaction. On the other hand, modification of the organosilicate and/or its condensate (A) by introducing an alkyl chain having 8 or more carbon atoms may be effective for reducing the following solubility parameter, but orientation of the long chain alkyl moiety on the surface of the coating film may retard hydrolysis, resulting in making it impossible to form a coating film capable of showing low contamination from the early time after coating.

The organosihicate and/or its condensate (A) is selected so as to have a solubility parameter (hereinafter may simply be referred to as SP) lower than that of the resin contained in the coating composition, to which the component (A) is added. A higher SP value of the organosilicate and/or its condensate (A) compared with that of the resin in the coating composition may make difficult the orientation of the organosilicate and/or its condensate (A) onto the surface of the coating film, resulting in reducing stain resistance. A SP difference between the organosilicate and/or its condensate (A) and the resin in the coating composition is in the range of 0.01 or more, preferably 0.1 or more.

On the other hand, in the case where the organosiicate and/or its condensate (A) is added to a water based coating composition, a modified organosilicate prepared by reacting the organosilicate and/or its condensate with a polyalkylene glycol compound may also be added to the coating composition.

The above modified organosilicate may be prepared by partly reacting alkoxysilyl group in the organosilicate and/or its condensate with the polyalkylene glycol compound, which may be represented by the general formula:

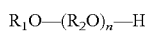

where $R_1$ represents hydrogen atom, alkyl group or aryl group, $R_2$ represents an alkylene group having 2 to 4 carbon atoms, and n is an integer of 2 to 60, and may include, for example, polyalkylene glycol such as polyethylene glycol, polypropylene glycol, polytetramethylene glycol and the like; alkoxypolyalkylene glycol such as methoxypolyehtylene glycol, ethoxypolyethylene glycol, ethoxypolypropylene glycol, ethoxypolyethylene glycol and the like; polyoxyalkylene alkylphenyl ether such as polyoxyalkylene monylphenyl ether, polyoxyethylene octylphenyl ether and the like; and the like. Of these, polyethylene glycol and polyoxyethylene monylphenyl ether are particularly preferred.

A reaction of the organosilicate and/or its condensate with the polyalkylene glycol compound may be carried out by subjecting to a dealcoholation reaction under heating. In this case, in order to promote the reaction, a catalyst may be added. The catalyst may include ones capable of promoting a exchange reaction between alkoxysilyl group and alcohol without particular limitations, for example, an organotin compound such as butyltintrioctoate, dibutyldndilaurate and the like; metal alkoxides, Lewis acids, organic protonic acids, inorganic protonic acids, and the like.

The above modified organosilicate may be prepared by reacting one mole of alkoxysilyl group in the organosilicate and/or its condensate (A) with 0.001 to 0.5 mole, preferably 0.01 to 0.2 mole of the polyalkylene glycol compound. The polyalkylene glycol compound less than 0.001 mol makes difficult mixing with the water based coating composition. When more than 0.5 mole, hydrolysis of the organosilicate is reduced, resulting poor stain resistance.

In the present invention, a mixing amount of the organosilicate and/or its condensate (A) is in the range of 0.1 to 50 parts by weight, preferably 1 to 20 parts by weight per 100 parts by weight of the resin solid content in the coating composition. A mixing amount less than 0.1 part by weight may result poor stain resistance of the coating film, and the mixing amount more than 50 parts by weight may result drawbacks of the resulting coating fill, for example, hardening, cracks, reduction in gloss and the like.

The acid surface active agent or the boric acid compound (B) in the present invention has a function to promote hydrolysis of the organosilicate and/or its condensate (A), and may include ones known in the art without particular limitations, for example, the surface active agent (B-1) such as phosphate based, sulfonate based, sulfate based, carboxylate based surface active agents and the like, and the boric acid compound (B-2) such as boric acid, trialkyl borate and the like.

The phosphate based surface active agent (B-1) may include, for example, polyoxyethylene phosphate, alkyl phosphate and the like. The sulfonate based surface active agent may include, for example, alkyl or alkylbenzene sulfonate such as sodium lauryl sulfonate sodium dodecylbenzene sulfonate and the like; alkylnaphthalene sulfonate such as sodium isopropylnaphthalene sulfonate and the like; alkyldiphenyl ether sulfonate, and the like. The sulfate based surface active agent may include, for example, alkyl or alkylbenzene sulfate, (poly)oxyethylene alkyl phenyl ether sulfate, and the like. The carboxylate based surface active agent may include, for example, alkylsulfosuccinate and the like. Of these, the phosphate based surface active agent is preferable.

Examples of the trialkyl borate as the boric acid compound (B-2) may include trimethyl borate, triethyl borate, tributyl borate and the like.

In the present invention, a condensation product of the organosilicate and/or its condensate (A) with the boric acid compound (B-2) may also be used. The boric acid-modified organosilirate and/or its condensate may be prepared by heating and reacting the organosilicate and/or its condensate, for example, tetramethoxysilane, tetraethoxysilane, methyltrimethoxysilane, ethyltrimethoxysilane and their condensates with orthoboric acid or methaborc acid in the presence of an alcohol solvent as disclosed in Japanese Patent Application Laid-Open No. 69634/89.

In the present invention, the surface active agent or the boric acid compound (P.) may be mixed in an amount in the range of 0.1 to 50 parts by weight, preferably 1 to 30 parts by weight per 100 parts by weight of the solid content of the organosilicate and./or its condensate (A). A mixing amount less than 0.1 part by weight makes it difficult to develop hydrophilic properties from early time after coating, and a mixing amount more than 50 parts by weight may undesirably shorten a service period of time or result reduction in gloss.

In the present invention, the coating composition containing the organosilicate and/or its condensate (A) and the surface active agent or the boric acid compound (B) may include various kinds of coating compositions such as an organic solvent based coating composition, water based coating composition, powder coating composition and the like.

The organic solvent based coating composition may include a reactively curing one and non-crosslinking one. The reactively curing coating composition may include a coating composition prepared by dissolving or dispersing a curable resin composition capable of forming a crosslinked coating film structure by being reacted and cured per se into an organic solvent, for example, a coating composition containing a curable resin composition comprising a base resin consisting of a hydroxyl group-containing resin such as fluorocarbon resin, acrylic resin, polyester resin, alkyd resin, silicone resin and the like, and a crosslinking agent such as polyisocyanate, amino resin and the like, and may also include a coating composition containing a curable resin composition comprising a base resin consisting of a resin containing silanol group and/or hydrolyzable silyl group, hydroxyl group and epoxy group as essential functional group components, or mixtures thereof, and a curing catalyst.

The non-crosslinking coating composition may include a solution type or dispersion type coating composition capable of forming a coating film by volatilizing the organic solvent at room temperature or under heating, for example, a cellulose denvative based coating composition, acrylic resin based coating composition, urethane resin based coating composition, vinyl chloride resin based coating composition, fluorocarbon resin based coating composition, alkyd resin based coating composition, vinyl acetate resin based coating composition, styrene-butadiene resin based coating composition, and the like.

The water based coating composition may include crosslinking type ones and non-crosslinking type ones, and may include a coating composition containing a water-dispersible resin or a water-soluble resin. The water-dispersible resin or the water-soluble resin may include, for example, combinations of acrylic resin emulsion or acry-lurethane resin emulsion with a crosslinking agent as a crosslinking type consisting of carbonyl group and hydrazide group as disclosed in Japanese Patent Application Laid-Open Nos. 249587/92 and 11193/95, or a crosslinking type consisting of hydroxyl group and isocyanate group as disclosed in Japanese Patent Application Laid-Open No. 219190/98, other acrylic resin emulsion, vinyl acetate emulsion, vinyl acetate-acrylic resin emulsion, ethylene-vinyl acetate emulsion, silicone acrylic emulsion, epoxy resin emulsion, alkyd resin emulsion, urethane resin emulsion, polyurethane emulsion, water-soluble acrylic resin, polyvinyl alcohol, natural or synthetic rubber latex, and the like.

The coating composition of the present invention may optionally contain additives for use in the coating composition, for example, colorant, filler, flow control agent, anti-foaming agent, plastisizer, curing catalyst, ultra-violet light absorber, and the like.

The coating composition of the present invention is applicable various kinds of substrates and coating substrates thereof, and coating thereof may be carried out by the general coating methods such as brushing, spray coating, roller coating, various coater coatings, and the like. A coating amount is preferably in the range of 2 to 100 μm, preferably 10 to 40 μm as a dry film thickness.

EXAMPLE

The present invention is explained more in detail by the following Examples, in which "part" and "%" mean "part by weight" and "% by weight" respectively.

Examples 1–7 and Comparative Examples 1–14

Respective commercially available coating compositions shown in Table 1 were mixed and stirred with the organo-silicate and/or its condensate, acid surface active agent or boric acid compound in accordance with the formulations (amount based on the resin solid content of the coating composition) as shown in Table 1 to prepare respective coating compositions of Examples 1–7 and Comparative Examples 1–14. In Table 1, (Note 1) to (Note 11) are explained as follows.

(Note 1) Ales Retan: Trade name, marketed by Kansai Paint Co., Ltd., solvent based acrylic urethane resin coating composition, SP value of the resin: 9.24.

(Note 2) Ales Aqua Retan: Trade name, marketed by Kansai Paint Co., Ltd., crosslinking type water based acrylic urethane resin coating composition.

(Note 3) ES48: Trade name, marketed by Colcoat Co., Ltd., low condensation product of ethyl silicate, SP value: 8.84.

(Note 4) Modified organosilicate: A reactor equipped with a stirrer, thermometer, reflux condenser, nitrogen inlet and water separator was charged with 500 g of Ethyl Silicate 48 (trade name, marketed by Tama Chemicals Co., Ltd), 324.5 g of Newcol 568 (trade name, marketed by Nippon Nyukazai Co., Ltd., polyoxyethylene nonyl phenyl ether) and 0.082 g of Scat 24 (trade name, marketed by Sakkyo Organic Chemicals Co., Ltd.), followed by heating up to 120° C. with agitation under nitrogen atmosphere, heating up to 160° C. over 4 hours, keeping at that temperature for one hour, and distilling off 25 g of evaporating ethanol and the like to obtain 800 g of modified organosilicate.

(Note 5) Boric acid-modified ethyl silicate: A reactor was charged with 744 g of Ethyl Silicate 40 (trade name, marketed by Tama Chemicals Co., Ltd.), 62 g of orthoboric acid and 178 g of ethyl alcohol, followed by heating and reacting under reflux for 2 hours, and carrying out condensation reaction for one hour while solvating by 316 g to obtain a boric acid-modified ethyl silicate having a nonvolatile content of 80%.

(Note 6) Triethyl borate: Reagent marketed by Tokyo Kasei Kogyo Co., Ltd.

(Note 7) Plysurf A-212E: Trade name, marketed by Dai-ichi Kogyo Seiyaku Co., Ltd., acid phosphate.

(Note 8) EMS-485: Trade name, marketed by Colcoat Co., Ltd., low condensation product of ethyl/methyl silicate, ethyl/methyl=50/50 (molar ratio), SP 8.75.

(Note 9) X40-2638: Trade name, marketed by Shinetsu Chemical Co., Ltd., low condensation product of long chain ($C_{10}$) alkyl-modified ethyl/methyl silicate, SP7.79.

(Note 10) X41-1805: Trade name, marketed by Shinetsu Chemical Co., Ltd., low condensation product of mercapto-modified ethyl/methyl silicate, SP8.26.

(Note 11) Modified organosilicate: A reactor equipped with a stirrer, thermometer, reflux condenser, nitrogen inlet and water separator was charged with 500 g of ES-48 (trade name, marketed by Colcoat Co., Ltd., ethyl silicate), 345 g of n-octanol ($C_8$) and 0.082 g of Scat 24 (trade name, marketed by Sankyo Organic Chemicals Co., Ltd.), followed by heating up to 120° C. with agitation under nitrogen atmosphere, heating up to 160° C. over 4 hours, keeping at that temperature for one hour to obtain a long chain alcohol-modified organosilicate having a SP of 8.26.

TABLE 1

| | | Examples | | | | | | | Comparative Examples | | | | | | |
|---|---|---|---|---|---|---|---|---|---|---|---|---|---|---|---|
| | | 1 | 2 | 3 | 4 | 5 | 6 | 7 | 1 | 2 | 3 | 4 | 5 | 6 | 7 |
| Coating Composition | Ales Retan (Note 1) | 100 | 100 | 100 | | 100 | 100 | 100 | 100 | 100 | 100 | 100 | | | |
| | Ales Aqua Retan (Note 2) | | | | 100 | | | | | | | | 100 | 100 | 100 |

TABLE 1-continued

| | | | | | | | | | | | | | |
|---|---|---|---|---|---|---|---|---|---|---|---|---|---|
| ES48 | (Note 3) | 20 | 20 | | | | | 20 | 20 | 60 | | | |
| Modified organosilicate | (Note 4) | | | 20 | | | | | | | | 20 | 20 |
| Boric acid-modified ethyl silicate | (Note 5) | | 20 | | | | | | | | | | |
| Triethyl borate | (Note 6) | 5 | | | 5 | 5 | | 5 | | 20 | 15 | 1 | | 20 |
| Plysurf A-212E | (Note 7) | | 5 | | | | 5 | | | | | | | |
| EMS-485 | (Note 8) | | | | | 20 | 20 | | | | | | | |
| X40-2638 | (Note 9) | | | | | | | | | | | | | |
| X41-1805 | (Note 10) | | | | | | | 20 | | | | | | |
| Modified organosilicate | (Note 11) | | | | | | | | | | | | | |

| | | Comparative Examples | | | | | | |
|---|---|---|---|---|---|---|---|---|
| | | 8 | 9 | 10 | 11 | 12 | 13 | 14 |
| Coating Composition | Ales Retan (Note 1) | 100 | 100 | 100 | 100 | 100 | 100 | 100 |
| | Ales Aqua Retan (Note 2) | | | | | | | |
| ES48 | (Note 3) | | | | | | | |
| Modified organosilicate | (Note 4) | | | | | | | |
| Boric acid-modified ethyl silicate | (Note 5) | | | | | | | |
| Triethyl borate | (Note 6) | | | | 5 | | 5 | |
| Plysurf A-212E | (Note 7) | | | | | | | |
| EMS-485 | (Note 8) | 20 | | | | | | |
| X40-2638 | (Note 9) | | 20 | 20 | | | | |
| X41-1805 | (Note 10) | | | | | 20 | | |
| Modified organosilicate | (Note 11) | | | | | | 20 | 20 |

Coating Film Performance Test

Coating films of Example 1–7 and Comparative Examples 1–14 as shown in Table 1 were subjected to coating film performance tests as follows. Results are shown in Table 2.

Preparation of Test Panel:

Esco (trade name, marketed by Kansai Paint Co., Ltd., Epoxy resin based anticorrosive coating composition) was coated onto a zinc phosphate-treated 0.8 mm thick steel sleet so as to be a dry film thickness of 50 μm respectively, followed by drying for one day, coating an Epomarine intercoating (trade name, marketed by Kansai Paint Co., Ltd., Epoxy resin based intercoat coating composition) so as to be a dry film thickness of 30 μm, and drying for one day to prepare a test panel respectively.

A stripe-like contaminating rain mark resistant properties test was carried out by use of a test panel shown in FIG. 1.

In Table 2, (*1) to (*4) are represented as follows.

(*1) Hydrophilic Properties: Respective coating compositions of Examples and Comparative Examples were coated onto a test panel so as to be a dry film thickness of about 20 μm, followed by drying for 7 days under the conditions of 20° C. and 65% RH to obtain a coating test panel respectively, applying the coating test panel to a Sunshine Carbon Arc Weathermeter for 4 hours respectively, and measuring a contact angle (°) to water on the surface of a resulting coating film respectively.

(*2) Stripe-like contaminating rain mark resistant properties: Respective coating compositions of Examples and Comparative Examples were coated in the same manner as in the above (*1) onto the test panel shown in FIG. 1 to prepare a coating test panel respectively, exposing outdoors for 3 months in such a condition as shown in FIG. 1 on the north side at Ota-ku, Tokyo, Japan, respectively, and visually evaluating stripe-like contaminating rain marks as follows. 4: No stripe-like contaminating rain marks developed, 3: some stripe-like contaminating rain marks developed, 2: No stripe-like contaminating rain marks developed, but contamination developed all over the surface, 1: stripe-like contaminating rain marks developed, and contamination developed all over the surface.

(*3) Self-recoat properties: Respective coating compositions of Examples and Comparative Examples were coated onto a test panel so as to be a dry film thickness of about 20 μm respectively, followed by drying for 7 days under the conditions of 20° C. and 65% RH, recoating thereonto the above coating compositions so as to be a dry film thickness of about 20 μm, and drying for 7 days under the conditions of 20° C. and 65% RH to obtain a coating test panel, completely dipping into water for 48 hours, taking out the coating test panel, two hours thereafter, making cross cuts, adhering an adhesive cellophane tape, and peeling off immediately thereafter to examine the surface of the coating film respectively. Evaluation-was made as follows. 3: No peeling observed, 2: partial peeling observed, 1: complete peeling observed.

(*4) Gloss: Respective coating compositions of Examples and Comparative Examples were coated onto a test panel so as to be a dry film thickness of about 20 μm, followed by drying for 7 days under the conditions of 20° C. and 65% RH to obtain a coating test panel respectively. Gloss on the surface of the coating film was visually evaluated as follows. 2: good, 1: hazy.

TABLE 2

|  | Examples | | | | | | | Comparative Examples | | | | | | | | | | | | | |
| --- | --- | --- | --- | --- | --- | --- | --- | --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 | 7 | 8 | 9 | 10 | 11 | 12 | 13 | 14 |
| Hydrophilic properties (contact angle to water) (*1) | 34 | 58 | 40 | 65 | 39 | 46 | 49 | 64 | 52 | 41 | 81 | 71 | 65 | 79 | 74 | 85 | 80 | 69 | 77 | 76 | 80 |
| Stripe-like contaminating rain mark resistant properties (*2) | 4 | 4 | 4 | 3 | 4 | 4 | 4 | 3 | 4 | 4 | 2 | 3 | 3 | 1 | 3 | 1 | 1 | 3 | 2 | 2 | 1 |
| Self-recoat properties (*3) | 3 | 3 | 3 | 3 | 3 | 3 | 3 | 2 | 3 | 2 | 3 | 2 | 3 | 3 | 2 | 1 | 1 | 2 | 2 | 2 | 3 |
| Gloss (*4) | 2 | 2 | 2 | 2 | 2 | 2 | 2 | 2 | 1 | 1 | 2 | 2 | 1 | 2 | 2 | 2 | 2 | 2 | 2 | 2 | 2 |

Effect of the Invention

The present invention provides a coating composition containing the organosilicate and/or its condensate and the acid surface active agent or boric acid compound in a specified amount respectively, and capable of forming a coating film developing low contamination properties from early time after coating, and showing good interlayer adhesion properties to the substrate.

Particularly, the use of the coating composition containing an organic solvent based coating composition, an organosilicate and/or its condensate having a SP lower than that of the resin contained in the coating composition, and an acid surface active agent or a boric acid compound in a specified amount respectively makes it possible to orientate the organosilicate and/or its condensate toward the surface of the coating film and to promote hydrolysis thereof. Consequently, the coating composition of the present invention can form a coating film showing low contamination properties from early time after coating, and good interlayer adhesion properties to the substrate.

INDUSTRIAL APPLICABILITY

The coating composition of the present invention is useful as an outdoor coating composition to be coated onto outdoor substrates such as building structures and the like.

What is claimed is:

1. A coating composition containing 0.1 to 50 parts by weight of (A) an organosilicate represented by the general formula:

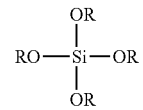

where R is same or different and represents hydrogen atom or monovalent hydrocarbon group having 1 to 7 carbon atoms, and/or its condensates per 100 parts by weight of a resin solid content in the coating composition, and 0.1 to 50 parts by weight of (B) a boric acid compound per 100 parts by weight of a solid content of the component (A).

2. A coating composition as claimed in claim 1, wherein the organosilicate and/or its condensate (A) has a solubility parameter lower than that of the resin contained in the coating composition.

3. A coating composition as claimed in claim 2, wherein the organosilicate and/or its condensate (A) is such that R of the general formula defined in claim 1 represents both ethyl group and methyl group.

4. A coating composition as claimed in claim 3, the organosilicate and/or its condensate (A) is modified by the reaction with a mercapto compound or a boric acid compound.

5. A coating composition as claimed in claim 1, wherein the coating composition contains a modified organosilicate prepared by reacting the organosilicate and/or its condensate (A) with a polyalkylene glycol compound.

6. A coating composition as claimed in claim 1, wherein the coating composition contains a condensation product between the organosilicate and/or its condensate (A) and the boric acid compound (B).

7. A coating composition as claimed in claim 1, wherein the boric acid compound (B) is trialkyl borate.

* * * * *